United States Patent Office 2,970,986
Patented Feb. 7, 1961

2,970,986

PROCESS FOR PREPARING LINEAR POLYESTERS INVOLVING INTERCHANGE BETWEEN A GLYCOL AND A DIALKYL-ESTER OF A DICARBOXYLIC ACID IN THE PRESENCE OF A TERTIARY AMINE

David W. Woodward, Little Silver, N.J., assignor to E. I. du Pont de Nemours and Company, Wilmington, Del., a corporation of Delaware No Drawing. Filed Feb. 1, 1956, Ser. No. 562,658

7 Claims. (Cl. 260—75)

This invention relates to an improved process for preparing polyesters, and more particularly to a process for preparing polymeric polymethylene terephthalates by an ester interchange reaction between a glycol and a dialkyl ester of terephthalic acid followed by polycondensation.

A novel class of fiber- and film-forming polymers consisting of polyesters of terephthalic acid and polymethylene glycols of the series $HO(CH_2)_nOH$, where "$n$" is an integer within the range of 2 to 10 inclusive, is disclosed in U.S. Patent 2,465,319 to Whinfield and Dickson. A commercially important example of this class is polyethylene terephthalate, which is prepared by carrying out an ester interchange reaction between ethylene glycol and dimethyl terephthalate followed by polymerization at elevated temperature and reduced pressure. In effecting these interchange and polymerization reactions, various catalytic agents have been employed to accelerate the rate of reaction. An example is litharge (PbO), as disclosed in U.S. 2,534,028 to Izard; other examples are disclosed in U.S. 2,465,319. For practical applications, it is usually desirable to use a catalyst system containing one or more components especially effective in promoting the ester interchange reaction between the glycol and the dialkyl terephthalate together with one or more additional components which are effective catalysts for the polymerization of the monomeric diglycol terephthalate. Examples of catalytic materials which have been proposed for use in the ester interchange reaction include the alkali metals and their hydrides and compounds of certain metals, such as calcium, zinc, lanthanum, manganese, and cobalt. Compounds of antimony and titanium have been found to be especially useful for catalyzing the polymerization of the monomeric ester.

Although catalysts are regarded as necessary for practical purposes, disadvantages are also associated with their use. Many catalysts which are soluble in the initial reaction mixture become insoluble and crystallize out as the polymerization proceeds. The insoluble material frequently remains suspended in the molten polymer during spinning or extrusion and leads to poor quality of the yarn or film. A portion of the insoluble material may also be deposited in the reaction equipment, an especially serious problem in a continuous polymerization process. Moreover, in many cases, it is found that catalysts effective in the ester interchange or polymerization reactions also catalyze undesirable reactions which lead to the formation of color. For these reasons, it is desirable to minimize the amount of catalyst employed. In particular, it would be very desirable to remove the ester interchange catalyst after its function has been performed to avoid undesirable effects of the catalyst in later processing steps. However, this has not been practicable with the various metallic compounds previously proposed as ester interchange catalysts.

It is an object of this invention to provide an improved process for preparing polyesters from glycols and dialkyl esters of dicarboxylic acids. Another object is to provide such a process in which the ester interchange reaction is catalyzed by a novel material which can be removed from the reaction mixture after the reaction is completed, following which a second catalyst is added and the mixture is polymerized by polycondensation. A further object is to provide a novel process for producing polyethylene terephthalate rapidly.

The foregoing objects are realized by the present invention which, briefly stated, comprises carrying out an ester interchange reaction between a glycol and a lower alkyl ester of a dicarboxylic acid in the presence of catalytic amounts of a tertiary amine containing from 3 to 18 carbon atoms, in which each of the carbon atoms attached to the nitrogen atom is linked to three atoms from the group consisting of carbon and hydrogen; distilling said amine from the reaction mixture and polymerizing the so-formed ester in the presence of a secondary catalytic material.

In its broadest scope the invention is applicable to the preparation of any polyester from a glycol and a dialkyl ester of a dicarboxylic acid. Among the glycols which may be employed are the glycols of the series $$HO(CH_2)_nOH$$

where "$n$" is an integer within the range of 2 to 10 inclusive, such as ethylene glycol, trimethylene glycol, pentamethylene glycol, or decamethylene glycol. Polyglycols, such as a polyethylene glycol having a molecular weight of from about 106 to about 6000, may also be used. Esters of any dicarboxylic acid and a saturated monohydroxy alcohol containing up to and including 4 carbon atoms may be used, specific examples being diethyl adipate, dimethyl terephthalate, dimethyl 4,4'-biphenyldicarboxylate, and diethyl sebacate. Mixtures of glycols or mixtures of esters may be employed. If desired, a minor proportion of a monocarboxylic ester, such as methyl o-benzoylbenzoate, may be present in the mixture to function as a chain terminating agent during the polycondensation reaction. Similarly, a minor proportion of a polycarboxylic ester, such as trimethyl tricarballylate, may be present to function as a cross-linking agent during the polycondensation reaction. The preferred embodiment of this invention is the preparation of bis-2-hydroxyethyl terephthalate followed by polycondensation to form polyethylene terephthalate, and the invention will hereinafter be described specifically with reference to this embodiment, using ethylene glycol and dimethyl terephthalate as starting materials.

Any tertiary amine containing at least 3 and not more than 18 carbon atoms, in which each of the carbon atoms attached to the nitrogen atom is linked to three atoms from the group consisting of carbon and hydrogen, is suitable for the purpose of this invention. As examples there may be mentioned the trialkylamines, such as trimethylamine, methyldiethylamine, triethylamine, tri-isoamylamine, trihexylamine, and cetyldimethylamine. Also useful are cycloaliphatic derivatives, such as N-cyclopentyldimethylamine and N-(2-cyclohexylethyl) diethylamine. Although aromatic amines are not satisfactory, trialkylamines containing aromatic substituents are useful catalysts according to the present invention, examples being N-benzyldiethylamine, N-methyldibenzylamine, and N-(2-β-naphthylethyl) dimethylamine. Another class of compounds falling within the scope of the present invention are the N-alkylalkyleneimines, such as N-ethylpiperidine, N-methylpyrrolidene, and N-methyldecamethyleneimine. Tertiary amines containing ether linkages on carbon atoms not directly connected to the nitrogen atom are also useful according to the present invention; examples are 2-ethoxyethyldiethylamine and N-ethylmorpholine. Tertiary amines containing only a single nitrogen atom and having no reactive functional groups, such as hydroxyl, ester, acetal, or unsaturated aliphatic groups, are preferred.

Surprisingly, the tertiary amines of this invention have been found to have high catalytic activity for ester interchange reactions; whereas, in most cases primary and secondary amines are relatively slow catalysts. Frequently, the desired reaction cannot be carried to completion with primary or secondary amines; whereas, tertiary amines have been found to give complete ester interchange in a relatively short time. Tertiary amines having no more than 18 carbon atoms are preferred, since the higher tertiary amines are less volatile and thereby more difficult to remove from the reaction mixture.

Since the volatile amine catalysts of this invention are distilled from the reaction mixture prior to polymerization, any convenient amount may be used which is sufficient to produce the desired rate of ester interchange. Usually, it will be desirable to use concentrations of at least 0.5 mol percent (based on the terephthalate ester) in order to carry out the reaction within a reasonable length of time. Although catalyst concentrations of 5 mol percent or even higher can be used if desired, it will usually be desirable to use concentrations of no more than about 3 mol percent in the case of less volatile amines to minimize the length of time required to distill the amine from the mixture after the reaction. When highly volatile amines are used, the desired concentration of amine can be maintained by continuous addition of the amine, preferably by bubbling the amine in gaseous form into the reaction mixture.

The following examples will serve to illustrate the principles and practice of this invention. It is to be understood, however, that any of the above-mentioned amines may be substituted for those shown in the examples with substantially similar results.

In each of the examples recorded in Table I, 50 parts of dimethyl terephthalate and 50 parts of ethylene glycol were placed in a flask together with the amount of catalyst indicated in the table (mol percentage of catalyst based on dimethyl terephthalate). The flask was fitted with a condenser and heated at atmospheric pressure, whereupon the mixture began to evolve methanol in the range 120-190° C., the temperature depending on the catalyst and its concentration. Heating was continued at such a rate that continuous gentle ebullition was maintained until no further methanol was evolved.

Examples 3-14 illustrate the use of the tertiary amines of this invention as ester interchange catalysts. Example 1 is included as a comparison to illustrate the use of litharge in 0.009 mol percent concentration, litharge in this concentration having been used commercially as a single catalyst to accomplish both the ester interchange and polymerization steps. As shown in the table, the ester interchange reaction is achieved more rapidly in every case by the tertiary amine catalysts of this invention than by 0.009 mol percent litharge. Example 2 illustrates the use of a higher concentration of litharge to achieve an ester interchange rate comparable to that achieved by the catalysts of the present invention; however, as will be shown hereinafter, the use of such high concentrations of litharge leads to unacceptable color in the product. Examples 15-18 are included to illustrate the relatively poorer results obtained when secondary amines or other basic nitrogen compounds outside the scope of the present invention are used.

TABLE I

| Ex. No. | Catalyst | Mol percent | Time required to complete evolution of methanol (hrs.) | Temperature at start of exchange reaction (° C.) |
|---|---|---|---|---|
| 1 | Litharge | 0.009 | 2.6 | 190 |
| 2 | ----do---- | 0.044 | 1.1 | 175 |
| 3 | Tributylamine | 3.5 | 1.5 | |
| 4 | {Tributylamine / Litharge} | {3.5 / 0.009} | }1.5 | |
| 5 | Triamylamine | 2.0 | 1.25 | 161 |
| 6 | Trihexylamine | 2.0 | 1.5 | 172 |
| 7 | N-methylpiperidine | 2.0 | 1.0 | 146 |
| 8 | Cetyldimethylamine | 2.0 | 1.25 | 147 |
| 9 | Lauryldiethylamine | 2.0 | 1.5 | 150 |
| 10 | Benzyldimethylamine | 1.0 | 1.5 | 177 |
| 11 | N-methyl-morpholine | 2.0 | 1.5 | 170 |
| 12 | N-benzyl-piperidine | 2.0 | 1.66 | 177 |
| 13 | N-cyclohexyl-diethylamine | 2.0 | 1.5 | 136 |
| 14 | Trimethylamine (gaseous; 160 c.c./min.) | | 1.5 | 121 |
| 15 | Dibutylamine | 2.0 | 2.6 | 159 |
| 16 | Piperidine | 2.0 | 2.6 | 140 |
| 17 | N-methylpyrrole | 2.0 | No reaction | |
| 18 | Ammonia (gaseous; 200 c.c./min.) | | Reaction ceased at 43% conversion. | |

Following the ester interchange reaction the amine catalyst is readily removed from the reaction mixture by distillation. In the case of the more volatile amines, heating the mixture at about 230° C. for a short time following the ester interchange reaction will usually suffice to remove the catalyst completely; part of the amine catalyst may even be distilled out of the reaction mixture during the ester interchange reaction, depending on the volatility of the amine. In the case of the higher boiling amines, it is usually desirable to hold the reaction mixture at about 230-240° C. at reduced pressures to ensure complete removal of the amine. If excess glycol has been added to the ester interchange mixture, which is usually desirable in order to facilitate the ester interchange, the excess glycol is conveniently distilled out with the amine catalyst; in fact, the removal of the amine is actually somewhat facilitated by simultaneous removal of the glycol.

Although the secondary catalyst may be added to the reaction mixture at any time, it is preferred that the secondary catalyst not be added until the amine catalyst has been completely removed from the reaction mixture. It has been found according to the present invention that optimum results in producing polymer of quite low color are achieved when the amine is completely removed before polycondensation begins. If the secondary catalyst is added before the amine is distilled out, the amine should be distilled out at a relatively low temperature so as to minimize polycondensation before the amine is removed.

As a secondary catalyst any material may be used which is effective in promoting polycondensation of diglycol esters of dicarboxylic acids. Antimony trioxide is particularly effective; it is also effective in the form of its salts and esters, such as potassium antimonate, antimony acetate, and antimony fluoride. Salts and esters of titanium, such as potassium titanate and tri-isopropyl titanate, are also effective polycondensation catalysts. The polycondensation is carried out at elevated temperature and reduced pressure as disclosed in U.S. 2,465,319.

In the examples below the intrinsic viscosity of the polymer, a measure of the degree of the polymerization, was determined in dilute solutions of the polymer in a solvent made up of 58.8 parts by weight of phenol and 41.2 parts by weight of trichlorophenol. The color values were determined by comparing the color of the molten polymer visually with arbitrary color standards consisting of aqueous solutions of Du Pont "Pontamine"

Catechu 3 G dye according to the following system of color ratings:

0=water,
1=0.00025 gram of dye per 100 ml. of solution,
2=twice as much dye as 1,
3=three times as much dye as 1,
4=four times as much dye as 1; and so on.

This system of color standards was designed as a measure of the yellowish to brown range of colors generally encountered in the preparation of polyethylene terephthalate.

*Example 19*

The monomeric ester obtained in Example 1 with 0.009% litharge was heated in a polymerization tube at 275° C. and a pressure of 1.0 mm. of mercury for 7 hours to yield a polymer having an intrinsic viscosity of 0.62 and a color of about 7 units. In contrast, a color of about 15 units was obtained by polymerizing for only 2 hours the monomer obtained in Example 2 by using 0.044% litharge; the intrinsic viscosity of this polymer was 0.45.

*Example 20*

The monomeric ester obtained in Example 4 with 3.5% tributylamine and 0.009% litharge was heated to 280° C. and the pressure was reduced to 0.2 mm. of mercury. The tributylamine and excess glycol were volatilized and removed. The mixture was maintained at these conditions for 2 hours and 15 minutes, resulting in the formation of a polymer having an intrinsic viscosity of 0.33. The color was a light buff corresponding to about 7 units of color, about the same as the color developed when the monomer was prepared with litharge alone.

*Example 21*

The monomeric ester obtained in Example 11 with N-methylmorpholine was held under a pressure of 50 mm. of mercury for 25 minutes while the temperature was increased to 232° C.; the temperature was then held at 232° C. and the pressure was reduced to 1.0 mm. during an additional 30 minutes. Antimony trioxide (0.03 mol percent based on dimethyl terephthalate) was then added and the mixture was polymerized for 6 hours at 275° C. and 1.0 mm. Polymer having an intrinsic viscosity of 0.67 and having quite low color, corresponding to 4.5 units of color, was obtained.

*Example 22*

The experiment of Example 21 was repeated using the monomeric ester obtained in Example 13 with N-cyclohexyldiethylamine, except that the mixture was polymerized for only 5 hours. Polymer having an intrinsic viscosity of 0.71 and a color of 6 units was obtained.

The present invention provides for rapid ester interchange, followed by removal of the catalyst, to produce a catalyst-free monomeric ester. The mixture is then polymerized in the presence of an appropriate polymerization catalyst, preferably added after the removal of the tertiary amine catalyst. By following the steps provided for by the present invention, a polyester of high viscosity, low color, and low concentration of inorganic impurities is produced within a short over-all reaction time. An additional advantage of the present invention is that the amine catalyst can be recovered for re-use from the distillate obtained from the reaction mixture.

It will be apparent that many widely different embodiments of this invention may be made without departing from the spirit and scope thereof, and therefore it is not intended to be limited except as indicated in the appended claims.

I claim:

1. In the process of preparing polyesters from a saturated glycol containing from 2 to 10 carbon atoms and a dialkyl ester of a dicarboxylic acid selected from the group consisting of terephthalic acid, 4,4'-biphenyl dicarboxylic acid, adipic acid, and sebacic acid and a saturated monohydroxy alcohol containing up to 4 carbon atoms by ester interchange followed by the polymerization of the glycol diester of said dicarboxylic acid by heating at a condensation temperature in the presence of a polymerization catalyst to provide a fiber-forming polymer, the improvement which comprises adding a catalytic amount of a tertiary amine containing from 3 to 18 carbon atoms in which each of the carbon atoms attached to the nitrogen atom is linked to 3 atoms selected from the group consisting of carbon and hydrogen to a reaction mixture comprising said saturated glycol and said dialkyl ester of said dicarboxylic acid and effecting the said ester interchange by heating said reaction mixture to a temperature of at least about 120° C. and thereafter distilling the amine from said reaction mixture before effecting said polymerization.

2. The process of claim 1 in which the amine catalyst is tributylamine.

3. The process of claim 1 in which the amine catalyst is triamylamine.

4. The process of claim 1 in which the amine catalyst is trihexylamine.

5. The process of claim 1 in which the amine catalyst is N-methylmorpholine.

6. The process of claim 1 in which the amine catalyst is N-cyclohexyldiethylamine.

7. The process of claim 1 in which the amine catalyst is present in the amount of from 0.5 to 5 mol percent based on the monomeric dicarboxylic acid ester.

References Cited in the file of this patent

UNITED STATES PATENTS

| | | |
|---|---|---|
| 2,614,120 | Caldwell | Oct. 14, 1952 |
| 2,647,885 | Billica | Aug. 4, 1953 |
| 2,779,783 | Hayes | Jan. 29, 1957 |